US006969232B2

(12) United States Patent
Zess et al.

(10) Patent No.: US 6,969,232 B2
(45) Date of Patent: Nov. 29, 2005

(54) FLOW DIRECTING DEVICE

(75) Inventors: Gary A. Zess, New Britain, CT (US);
Joel Wagner, Wethersfield, CT (US)

(73) Assignee: United Technologies Corporation,
Hartford, CT (US)

( * ) Notice: Subject to any disclaimer, the term of this patent is extended or adjusted under 35 U.S.C. 154(b) by 45 days.

(21) Appl. No.: 10/065,484

(22) Filed: Oct. 23, 2002

(65) Prior Publication Data

US 2004/0081548 A1 Apr. 29, 2004

(51) Int. Cl.$^7$ .............................................. F04D 29/54
(52) U.S. Cl. .................. 415/191; 415/914; 416/193 A; 416/234
(58) Field of Search ............................. 415/191, 208.1, 415/205.2, 210.1, 914; 416/193 A, 234, 228, 236 R

(56) References Cited

U.S. PATENT DOCUMENTS

| 2,735,612 | A | 2/1956 | Hausmann ............... 415/208.1 |
| 4,208,167 | A | 6/1980 | Yasugahira et al. ...... 415/210.1 |
| 5,846,048 | A | 12/1998 | Tomita et al. |
| 6,017,186 | A | 1/2000 | Hoeger et al. ............... 415/181 |
| 6,126,400 | A | 10/2000 | Nichols et al. |
| 6,419,446 | B1 | 7/2002 | Kvasnak et al. |

FOREIGN PATENT DOCUMENTS

| DE | 196 12 396 | 10/1997 | ............. F01D/5/14 |
| EP | 178242 A | 4/1986 | |
| EP | 0 798 447 | 10/1997 | ............. F01D/5/14 |
| EP | 0 945 594 | 9/1999 | ............. F01D/5/18 |
| EP | 1 074 697 | 2/2001 | ............. F01D/9/04 |
| FR | 781057 A | 5/1935 | |
| GB | 504214 A | 4/1939 | |
| GB | 2042675 A | 9/1980 | |
| JP | 52-74706 A | 6/1977 | |
| JP | 55142909 | 11/1980 | ............. F01D/9/02 |
| WO | 00/61918 | 10/2000 | ............. F01D/5/14 |
| WO | 01/75276 | 10/2001 | ............. F01D/5/14 |

OTHER PUBLICATIONS

International Search Report dated Feb. 4, 2004 in PCT/GB03/04545, a counterpart foreign application, Which indicates the degree of relecance of the four (4) non–English–language references cited above (EP 0 798 477, WO 01/75276, DE 196 12 396, and JP 55142909.).

"The Influence of a Horseshoe Vortex on Local Convective Heat Transfer", E. M. Fisher and P. A. Eibeck, Journal of Heat Transfer, May 1990, vol. 112/329–112/335.

"Iceformation Design of a Cylinder/Hull Juncture with Horseshoe Vortices and Unsteady Wake", R. S. LaFleur and L. S. Langston, pp. 87–97.

"Lecture I—Simulation Codes for Calculation of Heat Transfer to Convectively–Cooled Turbine Blades", M. E. Crawford (1986), pp. 1–1–1–27 together with 2 sheets of drawings and a list of References.

"Horseshoe Vortex Control by Suction Through a Slot in the Wall Cylinder Junction", D. P. Georgiou and V. A. Papavassilipoulos, $3^{rd}$ European Conference on Turbomachinery, Fluid Mechanics and Thermodynamics, London, England, Mar. 2–5, 1999, pp. 429–439.

(Continued)

Primary Examiner—Edward K. Look
Assistant Examiner—Dwayne J. White
(74) Attorney, Agent, or Firm—Brian J. Hamilla

(57) ABSTRACT

A flow directing device of a gas turbine engine, comprising: an airfoil having a leading edge, trailing edge, suction side and pressure side; a wall abutting the airfoil; and a fillet between the airfoil and wall. The fillet has an enlarged section at the leading edge, along the suction and pressure sides, and towards the trailing edge. The device could be part of a vane segment. In addition to eliminating a horseshoe vortex, the device also reduces heat load on the airfoil by directing the cooler gas from the proximal end of the airfoil to the hotter gas at the medial section of the airfoil.

59 Claims, 8 Drawing Sheets

OTHER PUBLICATIONS

"Heat Transfer in the Vicinity of a Large–Scale Obstruction in a Turbulent Boundary Layer", M. F. Blair, J. Propulsion, vol. 1, No. 2, pp. 158–160.

"Predictions of Endwall Losses and Secondary Flows in Axial Flow Turbine Cascades", O. P. Sharma, T. L. Butler, Journal of Turbomachinery, Apr. 1987, vol. 109, pp. 229–236.

Crossflows in a Turbine Cascade Passage:, L. S. Langston, Transactions of the ASME, vol. 102, Oct. 1980, pp. 866–874.

"Heat Transfer Effects of a Longitudinal Vortex Embedded in a Turbulent Boundary Layer", P. A. Eibeck, J. K. Eaton, Transactions of the ASME, vol. 109, Feb. 1987, pp. 16–24.

"Three–Dimensional Flow within a Turbine Cascade Passage", L. S. Langston, M. L. Nice, R. M. Hooper, Journal of Engineering for Power, Jan. 1977, pp. 21–28.

Study of Mean– and Turbulent–Velicity Fields in a Large–Scale Turbine–Vane Passage, D. A. Bailey, Transactions of the ASME, vol. 102, Jan. 1980, pp. 88–95.

"Horseshoe Vortex Formation Around a Cylinder", W. A. Eckerle, L. S. Langston, Transactions of ASME, vol. 109, Apr. 1987, pp. 278–285.

Geometry Modification Effects on a Junction Vortex Flow, F. J. Peirce, G. A. Frangistas, D. J. Nelson, Virginia Polytechnic Institute and State university, Blacksburg, Virginia 24061, pp. 37–44.

Juncture Flow Control Using Leading–Edge Fillets, L. R. Kubendran and W. D. Harvey, AIAA $3_{rd}$ Applied Aerodynamics Conference, Oct. 14–16, 1985, Colorado Springs, Colorado, cover sheet and pp. 1–5.

On the effect of a Strake–Like Junction Fillet on the Lift and Drag of a Wing, L. Bernstein and S. Hamid, Queen Mary and Westfield College, University of London, pp. 39–52.

Control of Horseshoe Vortex Juncture Flow Using a Fillet, Chao–Ho Sung and Chen–I Yang, David Taylor Research Center, Bethesda, Maryland 20084–5000 and L. R. Kubendran, NASA Langley Research Center, Hampton, Virginia 23665, pp. 13–20.

Effects of a Fillet on the Flow Past a Wing Body Junction, W. J. Devenport, M. B. Dewitz, N. K. Agarwal, R. Lo. Simpson, and K. Poddar,, AIAA $2^{nd}$ Shear Flow Conference, Mar. 13–16, 1989/ Tempe, AZ, cover sheet and pp. 1–11.

T. I–P Shih and Y.–L. Lin, "Controlling Secondary–Flow Structure by Leading–Edge Airfoil Fillet and Inlet Swirl to Reduce Aerodynamic Loss and Surface Heat Transfer", Proceedings of ASME Turbo Expo 2002, Jun. 3–6, 2002, Amsterdam, The Netherlands, Copyright© 2002 by ASME.

FLOW DIRECTING DEVICE

FEDERAL RESEARCH STATEMENT

The U.S. Government may have rights in this invention pursuant to Contract No. F33615-98-C-2905 with the United States Air Force.

BACKGROUND OF INVENTION

This invention relates to flow directing devices for use in gas turbine engines. Specifically, the present invention relates to an apparatus and a method of reducing heat load on an airfoil exposed to a gas flow.

The major components of a gas turbine engine include (beginning at the upstream end, or inlet) a fan section, one or more compressor sections, a burner section, one or more turbine sections, and a nozzle. The engine may also include an afterburner.

Air enters the engine through the inlet, travels past the fan section, becomes compressed by the compressor sections, mixes with fuel, and combusts in the burner section. The gases from the burner section drive the turbine sections, then exit the engine through the nozzle to produce thrust. If present, the afterburner could augment the thrust of the engine by igniting additional fuel downstream of the burner section.

The compressor and turbine sections include a plurality of rotor assemblies and stationary vane assemblies. Rotor blades and stator vanes are examples of structures (i.e., "flow directing structures") that direct core gas flow within a gas turbine engine. Air entering the compressor and traveling aft through the burner and turbine sections is typically referred to as "core gas." In and aft of the burner and turbine sections, the core gas further includes cooling air entering the flow path and the products of combustion products.

In and aft of the burner section, the high temperature of the core gas requires cooling of the components that contact the core gas. One such cooling schemes passes cooling air internally through the component and allowing it to exit through passages disposed within an external wall of the component. Another such cooling scheme utilizes a film of cooling air traveling along the outer surface of a component. The film of cooling air insulates the component from the high temperature core gas and increases the uniformity of cooling along the component surface.

Core gas temperature varies significantly within the core gas flow path, particularly in the first few stages of the turbine section aft of the burner section. In the axial direction, core gas temperature decreases in the downstream direction as the distance from the burner section increases. In the radial direction, core gas temperature has a peak at the medial region of the core gas flow path. The radially outer region and the radially inner region of the core gas flow path have the lowest core gas temperatures.

Various flow anomalies can affect the core gas flow. One such flow anomaly is a "horseshoe vortex." A horseshoe vortex typically forms where an airfoil abuts a surface forming one of the radial boundaries of the gas path, such as the platform of a stator vane. The horseshoe vortex begins along the leading edge area of the airfoil, traveling away from the medial region of the airfoil and towards the stator vane platform. The vortex next rolls away from the airfoil, travelling along the wall against the core gas flow. Subsequently, the vortex curls around to form the namesake flow pattern. The horseshoe vortex detrimentally affects components near the airfoil.

For example, the horseshoe vortex affects the useful life of the wall. Specifically, the horseshoe vortex augments the heat load of the stator vane platform by urging higher temperature medial region core gas flow to the platform. Unlike the airfoil, the platform lacks any cooling schemes that can offset the augmented heat load.

The horseshoe vortex also affects the useful life of the burner section. As discussed above, the horseshoe vortex draws higher temperature medial region core gas flow towards the radial boundary of the gas path. Such heat load augmentation may damage the liner in the burner section since the liner is adjacent (albeit upstream) to the stator vane platform.

Another such flow anomaly is a "passage vortex" that develops in the passage between adjacent airfoils in a stator or rotor section. The passage vortex is an amalgamation of the pressure side portion of the horseshoe vortex, core gas crossflow between adjacent airfoils, and the entrained air from the freesteam core gas flow passing between the airfoils. Collectively, these flow characteristics encourage some percentage of the flow passing between the airfoils to travel along a helical path (i.e., the "passage vortex") that diverts core gas flow from the center of the core gas path toward one or both radial boundaries of the core gas path. As with a horseshoe vortex, the passage vortex draws higher temperature center core gas flow towards the radial boundaries of the core gas path. This detrimentally affects the useful life of the stator vane platform.

U.S. Pat. No. 6,419,446, also owned by assignee of the present application, is an attempt to prevent horseshoe vortex and passage vortex formation. The patent describes the use of a fillet adjacent the stagnation line of the airfoil. While helping prevent horseshoe and passage vortex formation, the fillet does not reduce the heat load on the airfoil.

A need exists, therefore, for an apparatus and a method of reducing heat load on an airfoil exposed to a gas flow.

SUMMARY OF INVENTION

It is an object of the present invention to provide an improved flow directing device.

It is a further object of the present invention to provide a flow directing device and a method of reduced heat load on the flow directing device.

It is a further object of the present invention to provide a flow directing device that does not produce a horseshoe vortex.

It is a further object of the present invention to provide a flow directing device that directs gas flow from a lower temperature section of the flow directing device to a higher temperature section of the flow directing device.

These and other objects of the present invention are achieved in one aspect by a flow directing device. The device comprises: an airfoil having a leading edge, a trailing edge, a suction side and a pressure side; a wall abutting the airfoil; and a fillet between the airfoil and wall. The fillet has an enlarged section at the leading edge, along the suction and pressure sides, and towards the trailing edge.

These and other objects of the present invention are achieved in another aspect by a vane segment. The vane segment comprises: at least one platform; a plurality of airfoils extending from the at least one platform, each of the airfoils having a leading edge, a trailing edge, a suction side and a pressure side; and a fillet between each of the airfoils and the platform. Each of the fillets have an enlarged section at the leading edge, along the suction and pressure sides, and towards the trailing edge.

These and other objects of the present invention are achieved in another aspect by a method of reducing heat load on an airfoil. The method comprises the steps of: providing an airfoil with a proximal end that abuts a wall, a distal end and a medial section between said ends; flowing a gas over the airfoil, the gas adjacent the medial section of said airfoil having a higher temperature than the gas flowing over the proximal end of the airfoil; and directing the gas from the proximal end of the airfoil to the medial section of the airfoil.

BRIEF DESCRIPTION OF DRAWINGS

Other uses and advantages of the present invention will become apparent to those skilled in the art upon reference to the specification and the drawings, in which.

DETAILED DESCRIPTION

Figure 1:
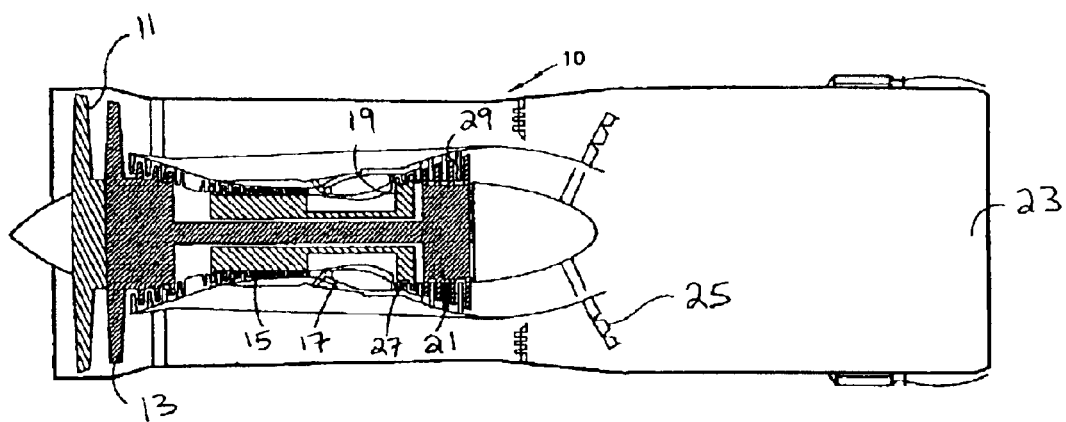
FIG. 1 is a cross-sectional view of an aircraft gas turbine engine.

FIG. 1 displays a gas turbine engine 10. The engine 10 has a fan section 11, compressor section 13, 15, a burner section 17, turbine sections 19, 21 and a nozzle 23. The engine could also include an afterburner 25. The compressor sections 13, 15 and the turbine sections 19, 21 each include alternating arrangements of stator vane stages 27 and rotor stages 29. The stator vane stages 27 guide core gas flow into or out of an adjacent rotor stage 29.

Figure 2:
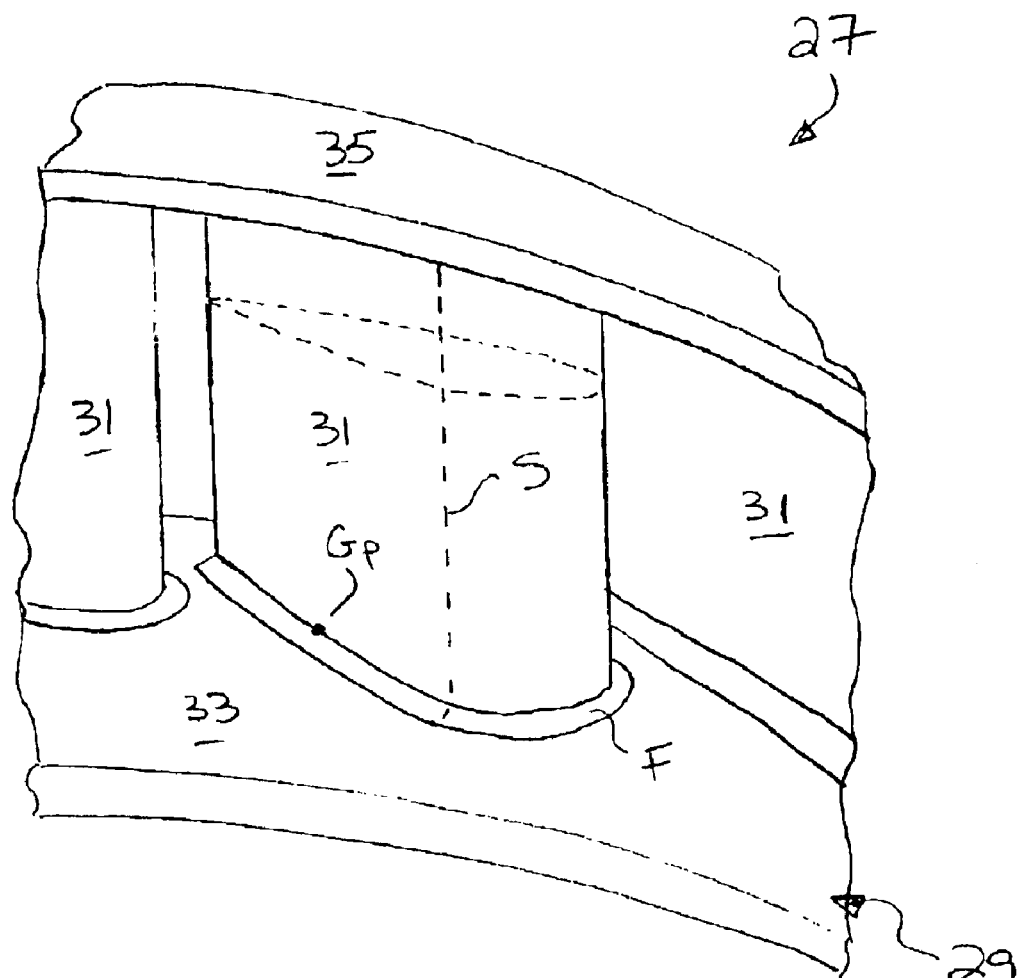
FIG. 2 is a perspective view of a conventional flow directing device.

FIG. 2 displays one of the stator vane stages 27. The stage 27 is segmented into stator vane clusters 29. Each cluster 29 has one or more airfoils 31 extending between an inner platform 33 and an outer platform 35. The platforms 33, 35 define the radial boundaries of the annular core gas path through the engine 10.

The clusters 29 are typically cast into a rough shape, then machined into a final form. The machining process does not create a perpendicular intersection between the airfoil 31 and the platforms 33, 35. Instead, the machining process provides a fillet F between the airfoil 31 and the platforms 33, 35. In other words, the fillet F is the material that fills in at the intersection of two surfaces.

Like all airfoils, airfoils 31 each have a stagnation line S. The stagnation lines S reside at the front of the airfoils 31 (in terms of core gas flow direction) and identifies the location where the core gas flow has zero velocity. The core gas flow reaching the airfoil 31 on the suction side of the stagnation line S travels along the suction side of the airfoil 31, while core gas flow reaching the airfoil 31 on the pressure side of the airfoil travels along the pressure side of the airfoil 31. The airfoils 31 also have gage points on the pressure side ($G_p$) and on the suction side ($G_s$—not seen in FIG. 1). The gage points $G_p$, $G_s$ define the end points of a line (not shown) that defines the minimum distance between adjacent airfoils 31.

Figure 3:
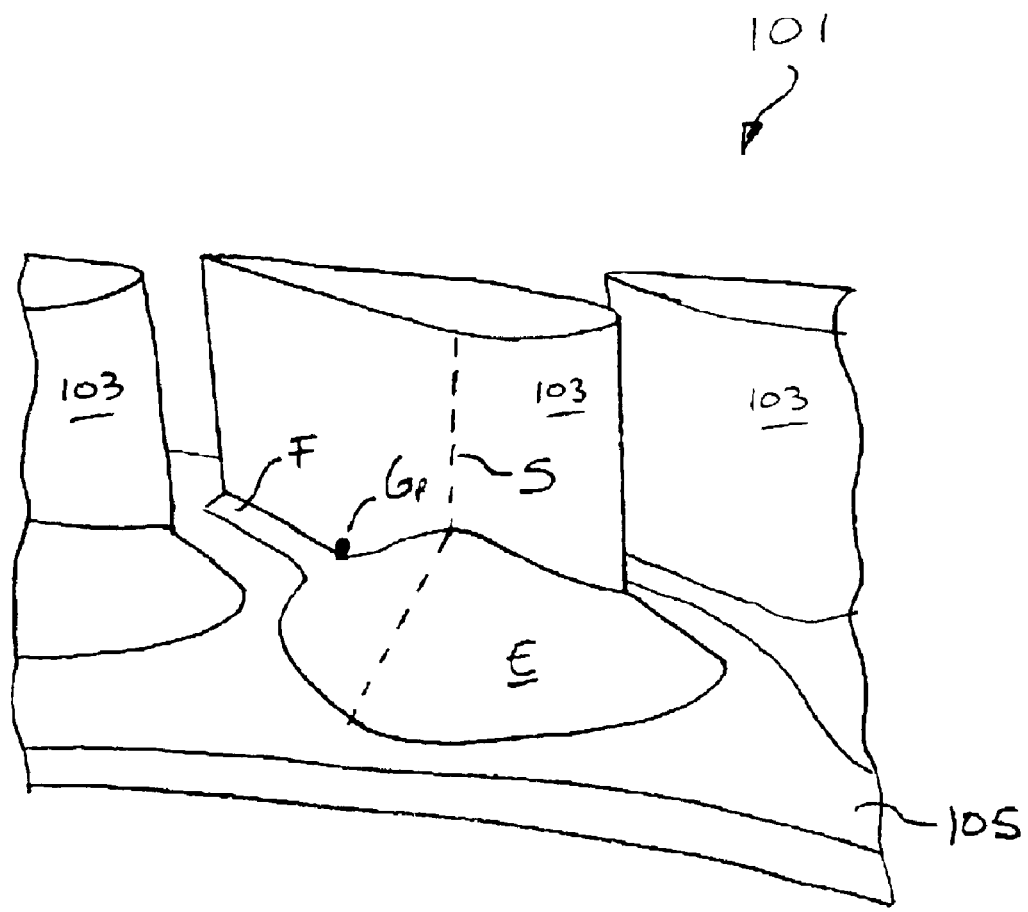
FIG. 3 is a perspective view of one embodiment of a flow directing device of the present invention.
Figure 4:
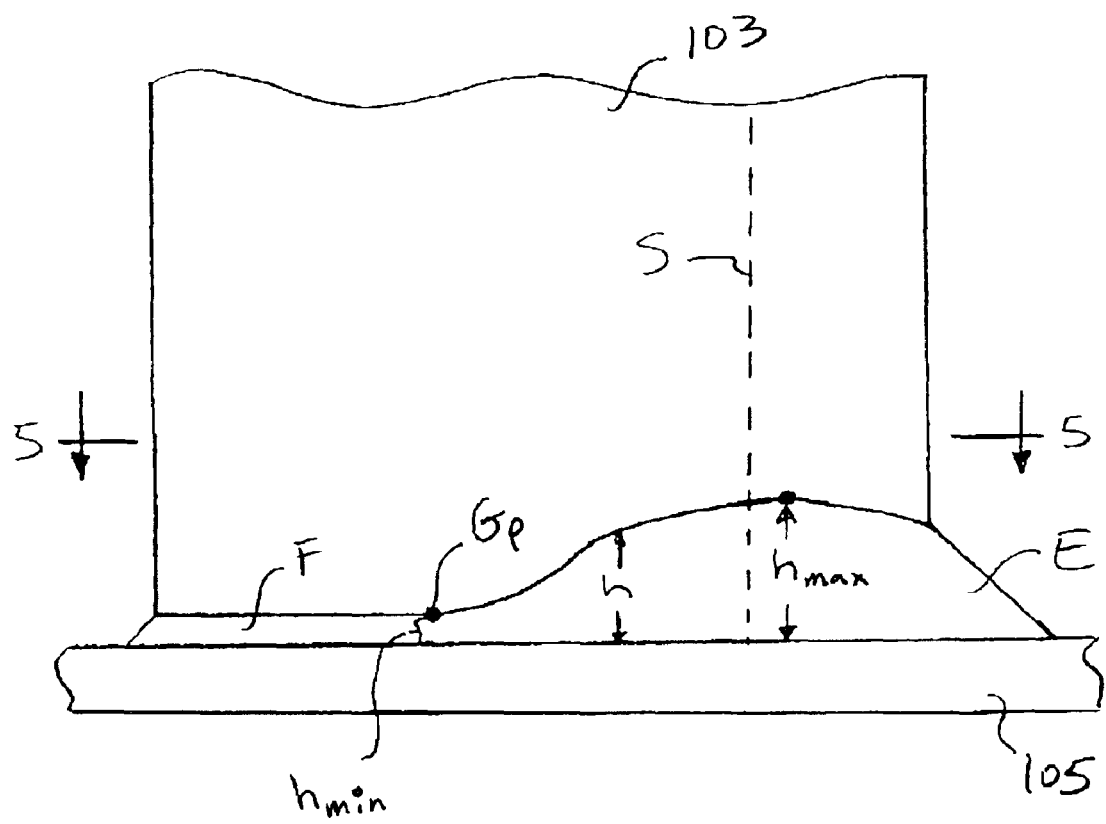
FIG. 4 is an elevational view of the flow directing device of FIG. 3.
Figure 5:
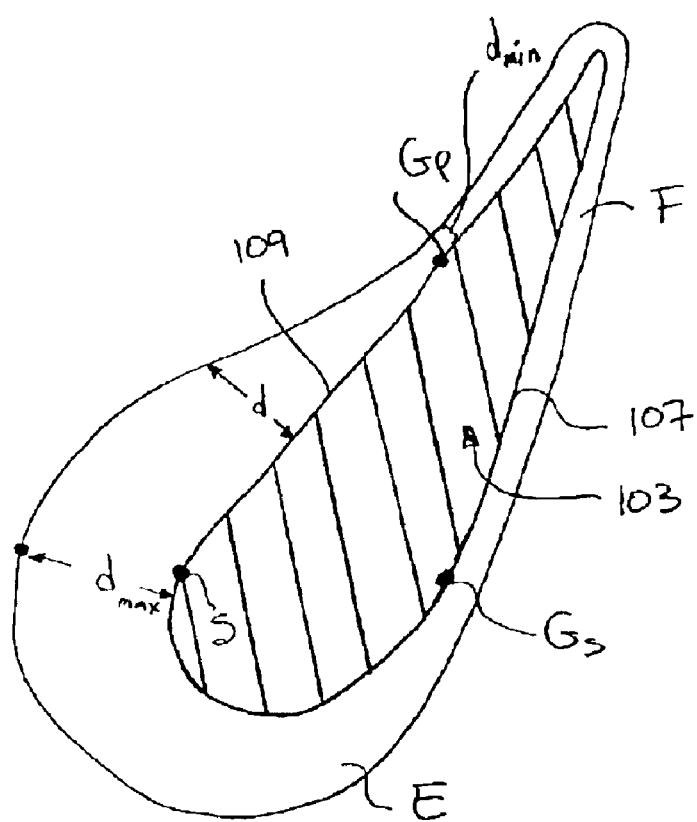
FIG. 5 is a cross-sectional view of the flow directing device taken along line 5—5 of FIG. 4.

FIGS. 3–5 display one embodiment of the present invention. FIG. 3 shows a stator vane cluster 101, which forms one segment of a stator vane stage of a gas turbine engine. The vane cluster 101 has one or more airfoils 103 extending between one or more platforms 105 (for clarity, FIG. 3 only shows the inner platform). The platforms 105 define the radial boundaries of the annular core gas path through the engine 10. The airfoils 103 have a suction side 107 and a pressure side 109. The clusters 101 are similar to clusters 29. Namely, the clusters 101 have a fillet F between the airfoil 103 and the platforms 105 as a result of the machining process. In addition, the airfoils 103 have stagnation lines S, gage points $G_s$ on the suction sides 107 and gage points $G_p$ on the pressure sides 109.

As seen in FIG. 5, the fillet F extends a distance d from the airfoil 103 around the perimeter thereof. Similarly, the fillet extends a height h along the airfoil 103 around the perimeter thereof.

Differently than clusters 29, the fillets F of clusters 101 have enlarged sections E and normal sections. Within the normal sections of the fillet F, the distance d and the height h typically remain constant. Within the enlarged sections E of the fillet F, however, the distance d and height h vary independently. Both the distance d and height h preferably follow continuous functions, such as a spline or a cosine. The use of continuous functions ensures that the enlarged section E lacks any discontinuities in slope while varying in curvature around the airfoil 103.

Distance d can vary between a minimum ($d_{min}$) and a maximum ($d_{max}$). The minimum distance $d_{min}$ preferably resides where the enlarged section E transitions to the normal section of the fillet F. This typically occurs near the gage points $G_s$, $G_p$. The maximum distance $d_{max}$ preferably resides near the stagnation line S within the enlarged section E. As seen in FIG. 5, the maximum distance $d_{max}$ preferably resides to the suction side of the stagnation line S. Certain situations may require the maximum distance $d_{max}$ to reside to the pressure side of the stagnation line S, such as when the airfoil 103 experiences negative incidence. The maximum distance $d_{max}$ is approximately 8 times greater than the minimum distance $d_{min}$.

Height h can vary between a minimum ($h_{min}$) and a maximum ($h_{max}$). The minimum height $h_{min}$ preferably resides where the enlarged section E transitions to the normal section of the fillet F. This typically occurs near the gage points $G_s$, $G_p$. The maximum height $h_{max}$ preferably resides near the stagnation line S within the enlarged section E. As seen in FIG. 4, the maximum height $h_{max}$ resides to the suction side of the stagnation line S. Certain situations may require the maximum height $h_{max}$ to reside to the pressure side of the stagnation line S, such as when the airfoil 103 experiences negative incidence. Typically, the location of maximum height $h_{max}$ corresponds to the location of maximum distance $d_{max}$. The maximum height $h_{max}$ is approximately 10 times greater than the minimum height $h_{min}$. Stated differently, the maximum height $h_{max}$ is approximately 30 percent of the span of the airfoil 103.

As seen in FIG. 5, the major extent of the enlarged section E of the fillet F resides at the leading edge of the airfoil 103. However, FIG. 5 also shows that the enlarged section E of the fillet F extends downstream along both the suction side 107 and pressure side 109 of the airfoil 103 towards the trailing edge of the airfoil 103. Preferably, the enlarged section E transitions to normal size near the gage points $G_s$, $G_p$ on both sides 107, 109 of the airfoil 103. By returning to the normal size of fillet F near the gage points $G_s$, $G_p$, the present invention does not interfere with the flow capacity of the vane stage. Without reducing the flow area through the stage, the present invention does not alter the exit Mach number nor the reaction of the stage (which impacts thrust load of the turbine).

Figure 6:
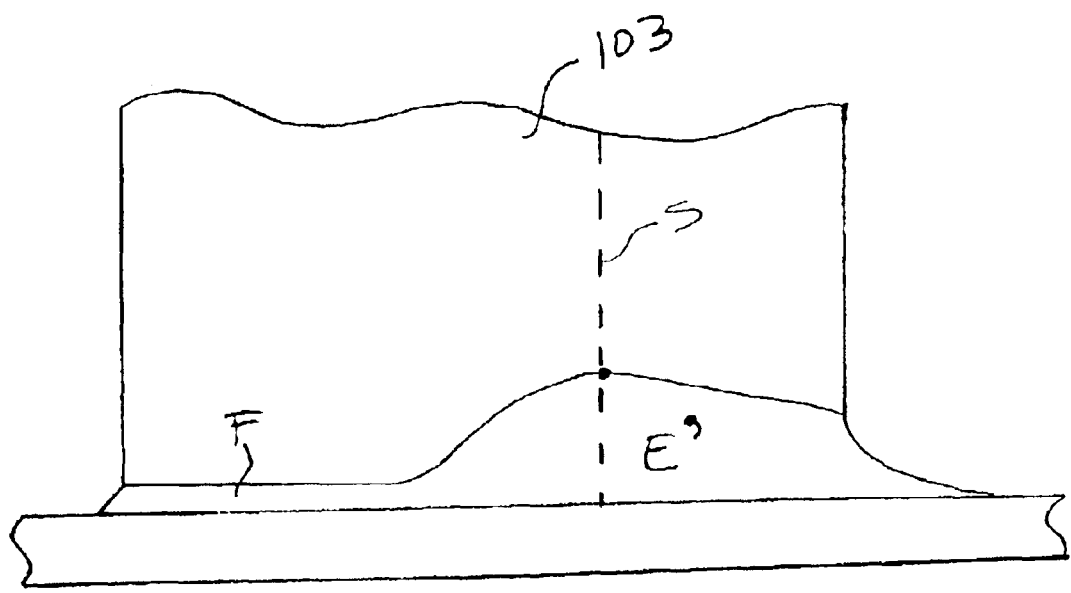
FIG. 6 is an elevational view of another flow directing device of the present invention.

Although FIG. 5 shows the enlarged section E residing entirely upstream of the gage points $G_s$, $G_p$, the present invention contemplates that the enlarged section E could reside both upstream and downstream of the gage points $G_s$, $G_p$ (not shown). In this arrangement, the enlarged section E would return to a normal size fillet F adjacent the gage points, then return to an enlarged section downstream (not shown). FIG. 4 shows that the profile of the enlarged section E of the fillet F is linear. However, FIG. 6 shows an alternative embodiment, in which an enlarged section E' of the fillet F has an arcuate profile. Preferably, the arcuate profile of the enlarged section E' of the fillet F is an elliptical shape.

Although described with respect to the inner platform of the vane cluster 101, the present invention could locate the enlarged sections E, E' of the fillets F on just the outer platform of the vane cluster (not shown in FIGS. 3–6 for clarity), or both.

Figure 7:
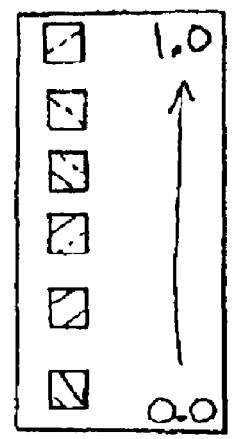
FIGS. 7 and 8 are graphical depictions of temperature contours of a fluid flowing past the flow directing devices of FIGS. 2 and 3, respectively.
Figure 7:
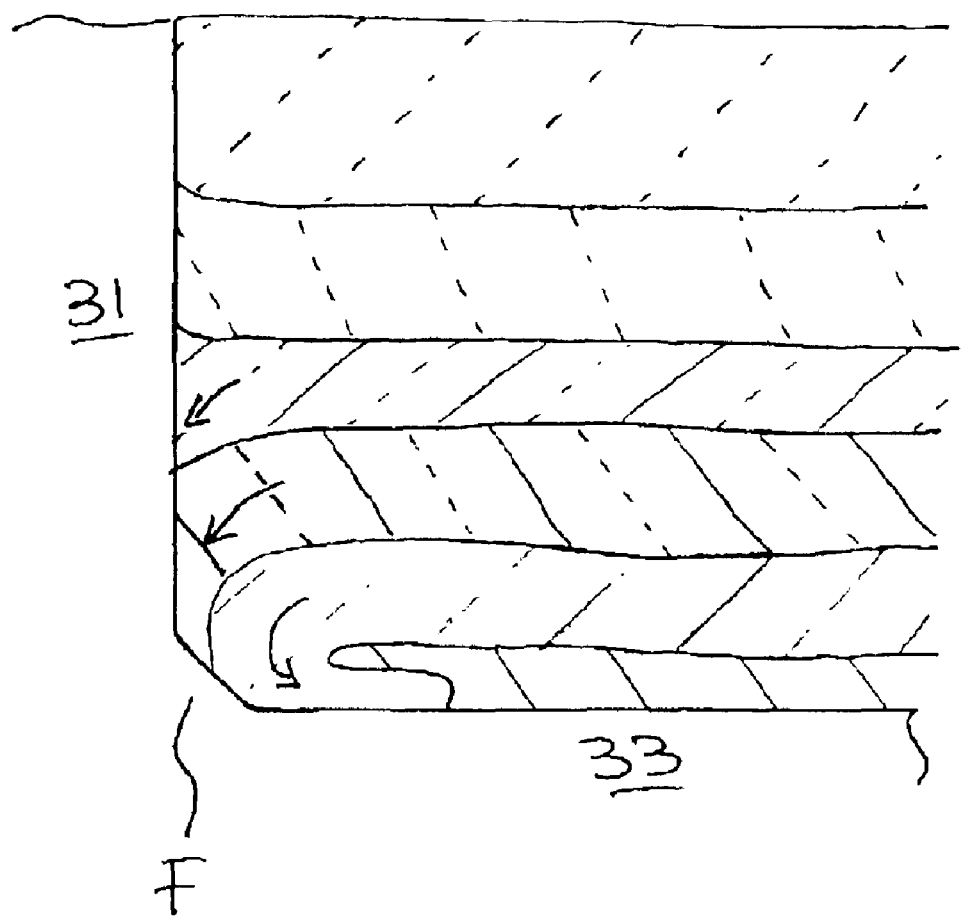

The present invention has clear benefits over conventional designs. As described above, various flow anomalies can affect conventional designs. FIG. 7 demonstrates the impact of a horseshoe vortex on core gas flow. The horseshoe vortex draws fluid from the medial region of the airfoil 31 towards the platform 33. This brings hotter core gas flow to the platform 33. The platform 33 is not as capable of withstanding hot core gas flow as is the airfoil. As a result, the hotter core gas flow can damage the platform and structures adjacent (upstream or downstream) of the platform.

Figure 8:
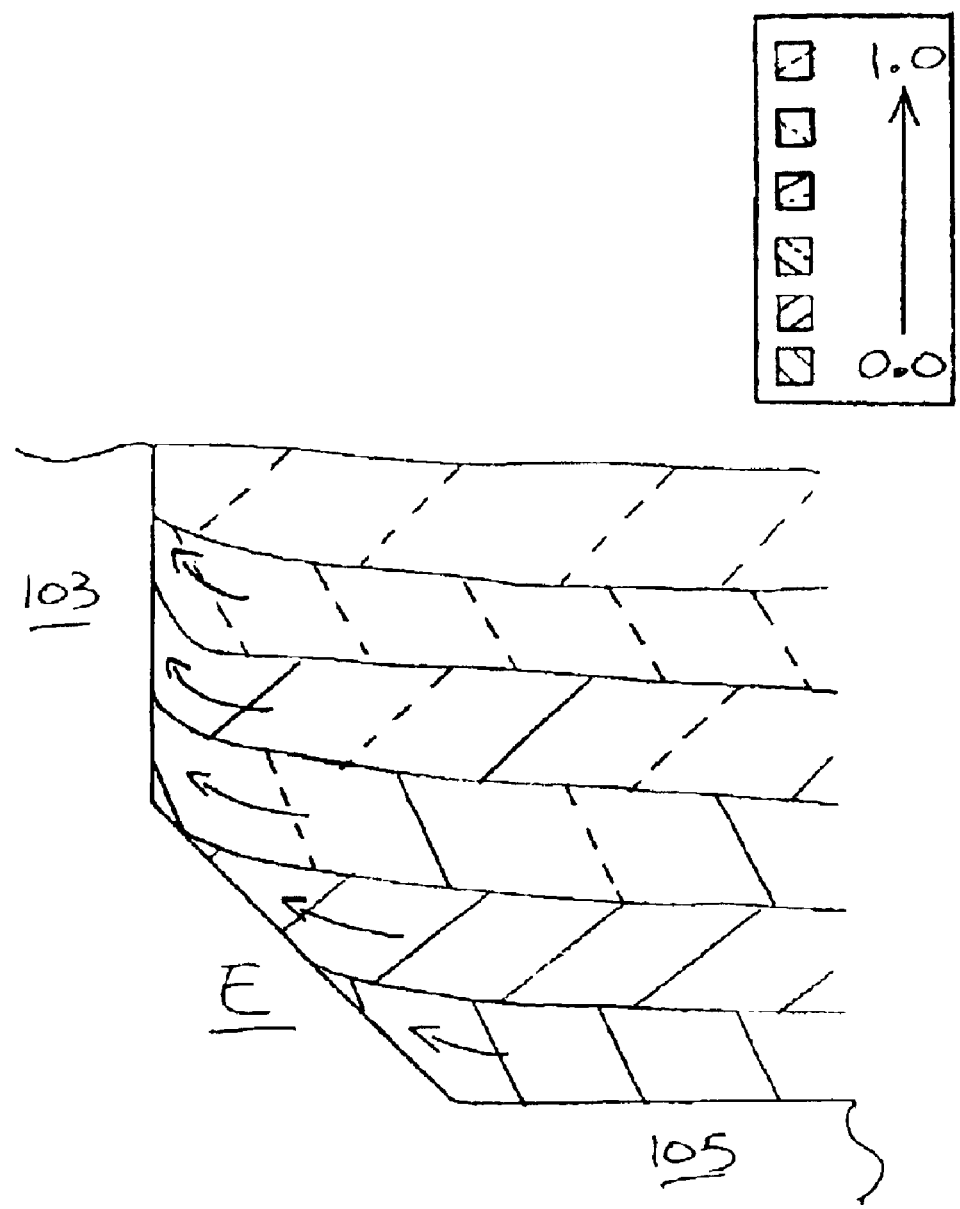

FIG. 8 shows that a horseshoe vortex does not exist adjacent the enlarged section E of the fillet F of the present invention. Without the horseshoe vortex, the core gas flow from the medial region of the airfoil 103 does not approach the platform 105. In fact, the enlarged section E of the fillet F of the present invention performs the opposite function. The enlarged section E directs fluid from adjacent the platform 105 towards the medial section of the airfoil 103. This brings cooler core gas flow to the airfoil 103.

The present invention also has a secondary benefit. The enlarged section E of the fillet E helps delay the development of the passage vortex between adjacent airfoils.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A flow directing device, comprising:
   an airfoil having a leading edge, a trailing edge, a suction side and a pressure side, wherein said suction side and said pressure side each have a gage point;
   a wall abutting said airfoil; and
   a fillet between said airfoil and wall;
   wherein said fillet has an enlarged section at said leading edge, along said suction and pressure sides, towards said trailing edge and ending adjacent said gage points.

2. The flow directing device of claim 1, wherein said fillet extends a distance from said airfoil, a maximum distance located in said enlarged section on said suction side of said airfoil.

3. The flow directing device of claim 2, wherein said airfoil has a stagnation line and said maximum distance is adjacent said stagnation line.

4. The flow directing device of claim 2, wherein a minimum of said distance located on a normal section of said fillet, said maximum distance approximately 8 times greater than said minimum distance.

5. The flow directing device of claim 1, wherein said fillet extends a height from said wall, a maximum of height located in said enlarged section on said suction side of said airfoil.

6. The flow directing device of claim 5, wherein said airfoil has a stagnation line and said maximum height is adjacent said stagnation line.

7. The flow directing device of claim 5, wherein a minimum of said height is located in a normal section of said fillet, said maximum height approximately 10 times greater than said minimum height.

8. The flow direction device of claim 5, wherein said airfoil has a span and said maximum height is approximately 30 percent of said span.

9. The flow directing device of claim 1, wherein said enlarged section has a linear height profile.

10. The flow directing device of claim 1, wherein said enlarged section has an arcuate height profile.

11. The flow directing device of claim 1, wherein said enlarged section has a variable curvature.

12. The flow directing device of claim 11, wherein said enlarged section does not have any slope discontinuities.

13. A vane segment, comprising:
    at least one platform;
    a plurality of airfoils extending from said at least one platform, each of said airfoils having a leading edge, a trailing edge, a suction side and a pressure side, wherein said suction side and said pressure side each have a gage point; and
    a fillet between each of said airfoils and said platform;
    wherein each of said fillets have an enlarged section at said leading edge, along said suction and pressure sides, towards said trailing edge and ending adjacent said gage points.

14. The vane segment of claim 13, wherein said fillet extends a distance from said airfoil, a maximum of said distance located in said enlarged section on said suction side of said airfoil.

15. The vane segment of claim 14, wherein said airfoil has a stagnation line and said maximum distance is adjacent said stagnation line.

16. The vane segment of claim 14, wherein a minimum of said distance is located in a normal section of said fillet, said maximum distance approximately 8 times greater than said minimum distance.

17. The vane segment of claim 13, wherein said fillet extends a height from said wall, a maximum of said height located in said enlarged section on said suction side of said airfoil.

18. The vane segment of claim 17, wherein said airfoil has a stagnation line and said maximum height is adjacent said stagnation line.

19. The vane segment of claim 17, wherein a minimum of said height is located in a normal section of said fillet, said maximum height approximately 10 times greater than said minimum height.

20. The flow direction device of claim 17, wherein said airfoil has a span and said maximum height is approximately 30 percent of said span.

21. The vane segment of claim 13, wherein maid enlarged section has a linear height profile.

22. The vane segment of claim 13, wherein said enlarged section has an arcuate height profile.

23. The vane segment of claim 13, wherein said enlarged section has a variable curvature.

24. The vane segment of claim 23, wherein said enlarged section does not have any slope discontinuities.

25. A method of reducing heat load on an airfoil, comprising the steps of:
providing an airfoil with a proximal end that abuts a wall, a distal end, a medial section between said ends, a leading edge, a trailing edge, a suction side and a pressure side, wherein said suction side and said pressure side each have a gage point;
flowing a gas over said airfoil, said gas adjacent said medial section of said airfoil having a higher temperature than said gas flowing over said proximal end of said airfoil; and
directing said gas from said proximal end of said airfoil to said medial section of said airfoil using a fillet between said airfoil and said wall, said fillet having an enlarged section at said leading edge, along said suction and pressure sides, towards said trailing edge and ending adjacent said gage points.

26. A flow directing device, comprising:
an airfoil having a leading edge, a trailing edge, a suction side, a pressure side and a stagnation line;
a wall abutting said airfoil; and
a fillet between said airfoil and said wall, said fillet having an enlarged section at said leading edge, along said suction and pressure sides and towards said trailing edge;
wherein said filler extends a distance from said airfoil and a height from said wall, and at least one of a maximum of said distance and a maximum of said height is located in said enlarged section and offset from said stagnation line.

27. The flow directing device of claim 26, wherein at least one of said maximum distance and said maximum height is offset from said stagnation line on said suction side of said airfoil.

28. The flow directing device of claim 26, wherein said suction said and said pressure side of said airfoil each have a gage point, said enlarged section ending adjacent said gage points.

29. The flow directing device of claim 26, wherein said fillet has normal section, a minimum of said distance located in said normal section, said maximum distance approximately 8 times greater than said minimum distance.

30. The flow directing device of claim 26, wherein said fillet has a normal section, a minimum of said height is located in said normal section, said maximum height approximately 10 times greater than said minimum height.

31. The flow direction device of claim 26, wherein said airfoil has a span and said maximum height is approximately 30 percent of said span.

32. The flow directing device of claim 26, wherein said flow directing device is part of a vane assembly.

33. A flow directing device, comprising:
an airfoil having a leading edge, a trailing edge, a suction side and a pressure side;
a wall abutting said airfoil; and
a fillet between said airfoil and said wall, said fillet having an enlarged section at said leading edge, along said suction and pressure sides and towards said trailing edge, and a normal section;
wherein said fillet extends a distance from said airfoil, a maximum of said distance is located in said enlarged section, a minimum of said distance is located in said normal section, and said maximum distance approximately 8 times greater than said minimum distance.

34. The flow directing device of claim 33, wherein said suction side and said pressure side of said airfoil each have a gage point, said enlarged section ending adjacent said gage points.

35. The flow directing device of claim 33, wherein said maximum distance is located on said suction side of said airfoil.

36. The flow directing device of claim 33, wherein said airfoil has a stagnation line and said maximum distance is offset from said stagnation line.

37. The flow directing device of claim 33, wherein said flow directing device is part of a vane assembly.

38. A flow directing device, comprising:
an airfoil having a leading edge, a trailing edge, a suction side and a pressure side;
a wall abutting said airfoil; and
a fillet between said airfoil and said wall, said fillet having an enlarged section at said leading edge, along said suction and pressure sides and towards said trailing edge, and a normal section;
wherein said fillet extends a height from said airfoil, a maximum of said height is located in said enlarged section, a minimum of said height is located in said normal section, and said maximum height is approximately 10 times greater than said minimum height.

39. The flow directing device of claim 38, wherein said suction side and said pressure side of said airfoil each have a gage point, said enlarged section ending adjacent said gage points.

40. The flow directing device of claim 38, wherein said maximum height is located on said suction side of said airfoil.

41. The flow directing device of claim 38, wherein said airfoil has a stagnation line and said maximum height is offset from said stagnation line.

42. The flow directing device of claim 38, wherein said flow directing device is part of a vane assembly.

43. A flow directing device, comprising:
an airfoil having a leading edge, a trailing edge, a suction side, a pressure side and a span;
a wall abutting said airfoil; and
a fillet between said airfoil and said wall, said fillet having an enlarged section at said leading edge, along said suction and pressure sides and towards said trailing edge, and a normal section;
wherein said fillet extends a height from said airfoil, a maximum of said height is located in said enlarged section, and said maximum height is approximately 30 percent of said span.

44. The flow directing device of claim 43, wherein said suction side and said pressure side of said airfoil each have a gage point, said enlarged section ending adjacent said gage points.

45. The flow directing device of claim 43, wherein said maximum height is located on said suction side of said airfoil.

46. The flow directing device of claim 43, wherein said airfoil has a stagnation line and said maximum height is offset from said stagnation line.

47. The flow directing device of claim 43, wherein said flow directing device is part of a vane assembly.

48. A flow directing device, comprising:
- an airfoil having a leading edge, a trailing edge, a suction side and a pressure side;
- a wall abutting said airfoil; and
- a fillet between said airfoil and said wall, said fillet having an enlarged section at said leading edge, along said suction and pressure sides, and towards said trailing edge;
- wherein said enlarged section has a variable curvature without any slope discontinuities.

49. The flow directing device of claim 48, wherein said suction side and said pressure side of said airfoil each have a gage point, said enlarged section ending adjacent said gage points.

50. The flow directing device of claim 48, wherein said fillet extends a distance from said airfoil, a maximum distance located in said enlarged section on said suction side of said airfoil.

51. The flow directing device of claim 48, wherein said airfoil has a stagnation line, said fillet extends a distance from said airfoil, and a maximum of said distance is offset from said stagnation line.

52. The flow directing device of claim 48, wherein said fillet has a normal section and extends a distance from said airfoil, a minimum of said distance is located on said normal section and a maximum of said distance is located on said enlarged section, said maximum distance approximately 8 times greater than said minimum distance.

53. The flow directing device of claim 48, wherein said fillet extends a height from said wall, and a maximum of said height is located in said enlarged section on said suction side of said airfoil.

54. The flow directing device of claim 48, wherein said airfoil has a stagnation line, said fillet extends a height from said wall, and a maximum of said height is offset from said stagnation line.

55. The flow directing device of claim 48, wherein said fillet has a normal section and extends a height from said airfoil, a minimum of said height is located in said normal section of said fillet, a maximum of said height is located in said enlarged section, and said maximum height is approximately 10 times greater than said minimum height.

56. The flow direction device or claim 48, wherein said airfoil has a span, said fillet extends a height from said airfoil, and a maximum of said height as approximately 30 percent of said span.

57. The flow directing device of claim 48, wherein said enlarged section has a linear height profile.

58. The flow directing device of claim 48, wherein said enlarged section has an arcuate height profile.

59. The flow directing device of claim 48, wherein said flow directing device is part of a vane assembly.

* * * * *